(No Model.)

J. STOLL.
WHEELBARROW.

No. 324,606. Patented Aug. 18, 1885.

Witnesses
G. M. Gridley
M. J. Schinner

Inventor
Jacob Stoll
By Erwin & Beaudist
Attorneys

N. PETERS, Photo-Lithographer, Washington, D. C.

United States Patent Office.

JACOB STOLL, OF MILWAUKEE, WISCONSIN, ASSIGNOR OF ONE-HALF TO GOTTFRED RADDATZ, OF SAME PLACE.

WHEELBARROW.

SPECIFICATION forming part of Letters Patent No. 324,606, dated August 18, 1885.

Application filed April 17, 1885. (No model.)

*To all whom it may concern:*

Be it known that I, JACOB STOLL, a citizen of the United States, residing at Milwaukee, in the county of Milwaukee and State of Wisconsin, have invented certain new and useful Improvements in Wheelbarrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in wheelbarrows, and pertains to the peculiar form and construction of the handles and legs and braces, as hereinafter set forth, reference being had to the drawings.

Figure 1:
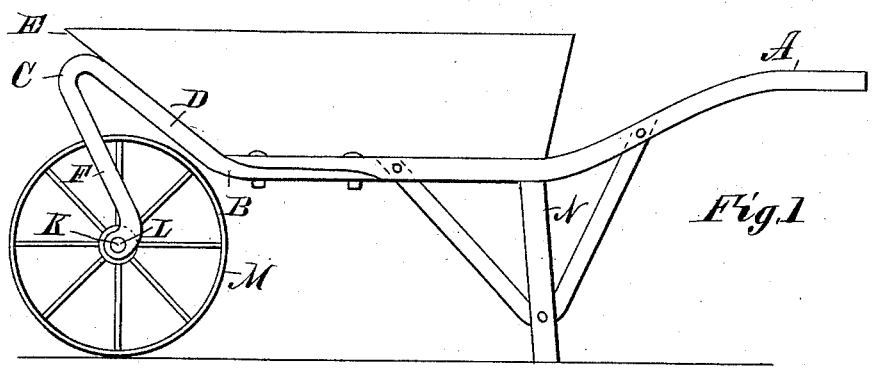
Figure 3:
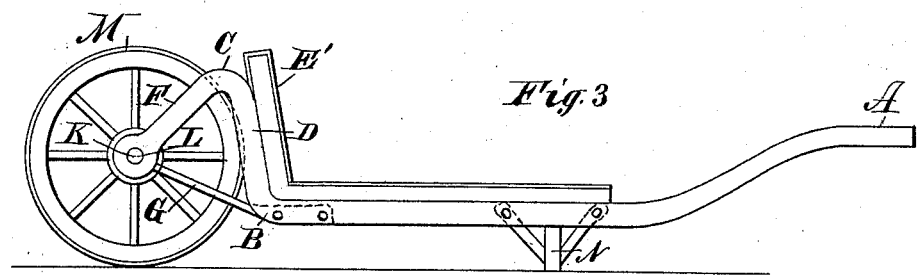
Figure 2:
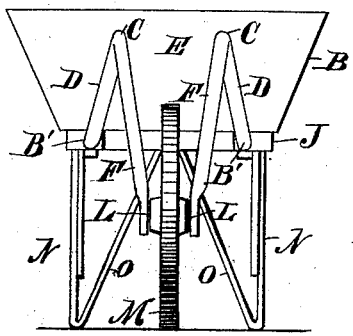
Figure 4:
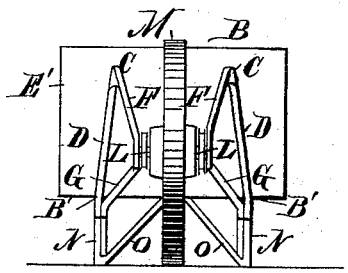

Figure 1 represents a side view, and Fig. 2 a front view, of a box wheelbarrow embodying my improvements. Fig. 3 represents a side view, and Fig. 4 represents a front view, of a modified form of my improvements as adapted to a platform-wheelbarrow.

Like parts are represented by the same reference-letters throughout the several views.

The handles A A are inclined upwardly and forwardly at their front ends at the angle B to the angle C, whereby an inclined bearing, D, is formed for supporting the front end of the box E or platform E', as shown in Figs. 1 and 3. From the apex of the angle C the handles are inclined downward and toward each other, as shown in Figs. 2 and 4, whereby I am enabled to use a short hub and axle, and whereby I am enabled, when dumping a load, to turn the box or platform up edgewise or nearly vertical without the hub being brought in contact with the ground. By thus contracting the front end of the wheelbarrow, or, in other words, by shortening the hub and inclining the handles toward each other so as to occupy smaller space at the front end, I am enabled to wheel the wheelbarrow through narrow spaces and turn short angles among stationary objects, as is frequently required in foundries and stonequarries, while it would be difficult to do the same with a long hub and straight widely-separated handles, as heretofore made. For a light box-wheelbarrow, the rear end of the handles may be made of wood or gas-pipe, and the same spliced to the angular metallic front ends, as shown in Fig. 1, and the braces G, as shown in Fig. 3, dispensed with. By inclining the lower ends, F, of the handles rearward and partially beneath the box E the load is brought above the wheel M, and thus the weight to be supported at the rear end of the handle is diminished. When, however, the wheelbarrow is to be used for heavy loads, the front end, F, is inclined forward so as to drop the platform nearer the ground, and it becomes necessary to insert the brace G to prevent the handles from being bent out or straightened. For heavy work I prefer to form the handles in one continuous piece of metal, as shown in Figs. 3 and 4. Both of the rear legs, N N, and their braces O O are formed of a single piece of metal, which is bent from wrought-iron, in the shape of the letter W, the two upper ends being rigidly bolted to the respective handles, from whence they extend downwardly and rearwardly to the ground, thence upwardly, converging at the center of the cross-bar J, meeting midway between the two ends of said bar, at which point they are rigidly bolted to the cross-bar, thus serving to support the center of said cross-bar, while they serve as braces to the legs. Holes K K are formed through the lower front ends of the handle A A, for the reception of the axle L of the wheel.

Having thus described my invention, what I claim as new, and desire to secure by Letters Patent, is—

1. In a wheelbarrow, the combination of the handles A A, having at their front ends an upward bend, D, adapted to serve as a support for the box or platform, and downwardly and inwardly converging ends F, terminating at the axle of the wheel, said ends being provided with holes K K, formed in and through them, for the reception of the wheel-axle, wheel M, and the box or platform, as set forth.

2. The combination of the handles A A, having upturned angular front bearings D, upon which the front end of the box or platform rests, downwardly-inclined ends F, terminating at the wheel-axle and provided with holes at such point, K, for the reception of the axle L, wheel M, and brace-rods G G, extending from the axle to the angle B, at which point it is affixed, substantially as and for the purpose specified.

In testimony whereof I affix my signature in presence of two witnesses.

JACOB STOLL.

Witnesses:
 JAS. B. ERWIN,
 M. J. SCHINNER.